United States Patent
Mills et al.

(10) Patent No.: US 6,954,482 B2
(45) Date of Patent: Oct. 11, 2005

(54) SOFT-DECISION TRELLIS-CODED DIFFERENTIAL FREQUENCY-HOPPED SPREAD SPECTRUM (DFHSS)

(75) Inventors: Diane G. Mills, Wilmington, MA (US); Cory S. Myers, Westford, MA (US); Geoffrey S. Edelson, Andover, MA (US); David L. Herrick, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/422,340

(22) Filed: Apr. 24, 2003

(65) Prior Publication Data

US 2004/0213327 A1 Oct. 28, 2004

(51) Int. Cl.[7] .............................................. H04L 27/30
(52) U.S. Cl. ...................... 375/132; 375/138; 375/265; 375/341; 370/330; 370/478
(58) Field of Search .......................... 375/130, 132–138, 375/262, 265, 316, 295, 261, 298, 341, 346; 370/319–321, 330, 335, 337, 342, 344, 437, 441, 442, 478–480; 455/62, 63, 95, 112, 151.2, 154.1, 267, 275; 714/792, 795, 796, 791

(56) References Cited

U.S. PATENT DOCUMENTS 5,193,102 A * 3/1993 Meidan et al. .............. 375/132
5,483,550 A * 1/1996 Hulbert ...................... 375/134
6,240,073 B1 * 5/2001 Reichman et al. .......... 370/319
6,345,073 B1 * 2/2002 Curry et al. ................ 375/265

OTHER PUBLICATIONS

PCT International Search Report dated Jan. 12, 2005 of International Application No. PCT/US04/12483 filed Apr. 21, 2004.*

* cited by examiner

Primary Examiner—Dac V. Ha
(74) Attorney, Agent, or Firm—Barry L. Haley; Daniel J. Long

(57) ABSTRACT

A method and system begin at a random node of a trellis model having a set of at least two axes, wherein one axis corresponds to time and a second axis corresponds to frequency, a set of M states, corresponding to a set of all possible frequencies that may be transmitted by the system, and branches leaving each state, that terminate at allowable transmit frequencies for a next frequency hop. The number of branches leaving each state is dependent on the number of encoded bits per hop. Next, B bits of data are passed to a buffer, where B is the number of bits that will be transmitted per frequency hop. The method and system then combine the B bits of data with information for previously selected frequencies to select a current frequency, transmit the selected frequency, and feedback the currently selected frequency information to be used as previously selected frequency information when selecting a next frequency.

30 Claims, 8 Drawing Sheets

SOFT-DECISION TRELLIS-CODED DIFFERENTIAL FREQUENCY-HOPPED SPREAD SPECTRUM (DFHSS)

"The invention was made with the United States Government support under Contract No. F30602-00-C-0157. The United States Government has certain rights in this invention."

BACKGROUND OF THE INVENTION

1. Field of the Invention

This invention generally relates to the field of digital communications, and more particularly relates to a system and method for providing a soft-decision trellis-coded, differential frequency-hopped spread spectrum waveform and decoder.

2. Description of Related Art

Spread spectrum communication techniques such as frequency hopping (FH) and direct sequence spread spectrum (DSSS) provide processing gain for users, thereby providing a reliable communications method for users. However, in the presence of many users, co-channel interference degrades the performance of the existing spread spectrum techniques. In addition, in some applications, it is desirable that the waveforms have a low probability of detection (LPD) by unintended receivers and the waveform is resilient in the presence of jamming signals (i.e. is anti-jam (AJ)). None of the existing spread-spectrum waveforms provide a signal that is simultaneously LPD, AJ, allows multiple simultaneous asynchronous users occupying the same time and frequency bands (conferencing), and is easily implemented.

Therefore a need exists to overcome the problems with the prior art as discussed above, and particularly for a system and method for providing a soft-decision trellis-coded, differential frequency-hopped spread spectrum waveform and decoder that produces improved AJ and LPD performance.

SUMMARY OF THE INVENTION

A method and system begin at a random node of a trellis model having two or more axes, at least one of which corresponds to frequency and at least one of which corresponds to time, a set of M states, corresponding to a set of all possible frequencies that may be transmitted by the system, and f branches leaving each state, that terminate at allowable transmit frequencies for a next frequency hop. The number of axes is dependent on the number of identifying features (e.g. phase, amplitude, dwell time, duty cycle) that the system designer chooses to track. Although the summary description specifically details transmitting data and determining a frequency value based on the current data and previous frequency values, the concept can be extended to apply to other properties or combinations of properties of the signal, including but not limited to, phase, coding, dwell, and duty cycle. The number of branches leaving each state, f, is dependent on the number of encoded bits per hop, B. Next, B bits of data are passed to a buffer, where B is the number of bits that will be transmitted per frequency hop. The method and system then combine the B bits of data with information for a previously selected frequency to select a current frequency, transmit the selected frequency, and feedback the currently selected frequency information to be used as previously selected frequency information when selecting a next frequency.

The signal is received and passed to a frequency detector, where at least one, frequency per a predetermined time interval is determined. The detected frequency is passed to a soft decision decoder that constructs a trellis model using the detected frequencies as nodes, estimates a data value according to the known trellis constraints of a transmitted signal, and outputs a data estimate.

The system is comprised of at least one soft-decision trellis-coded differential frequency-hopped spread spectrum transmitter; at least one communication link that may be wired, wireless, or any combination thereof; and at least one soft-decision trellis-coded differential frequency-hopped spread spectrum receiver.

DESCRIPTION OF THE PREFERRED EMBODIMENTS

Figure 1:
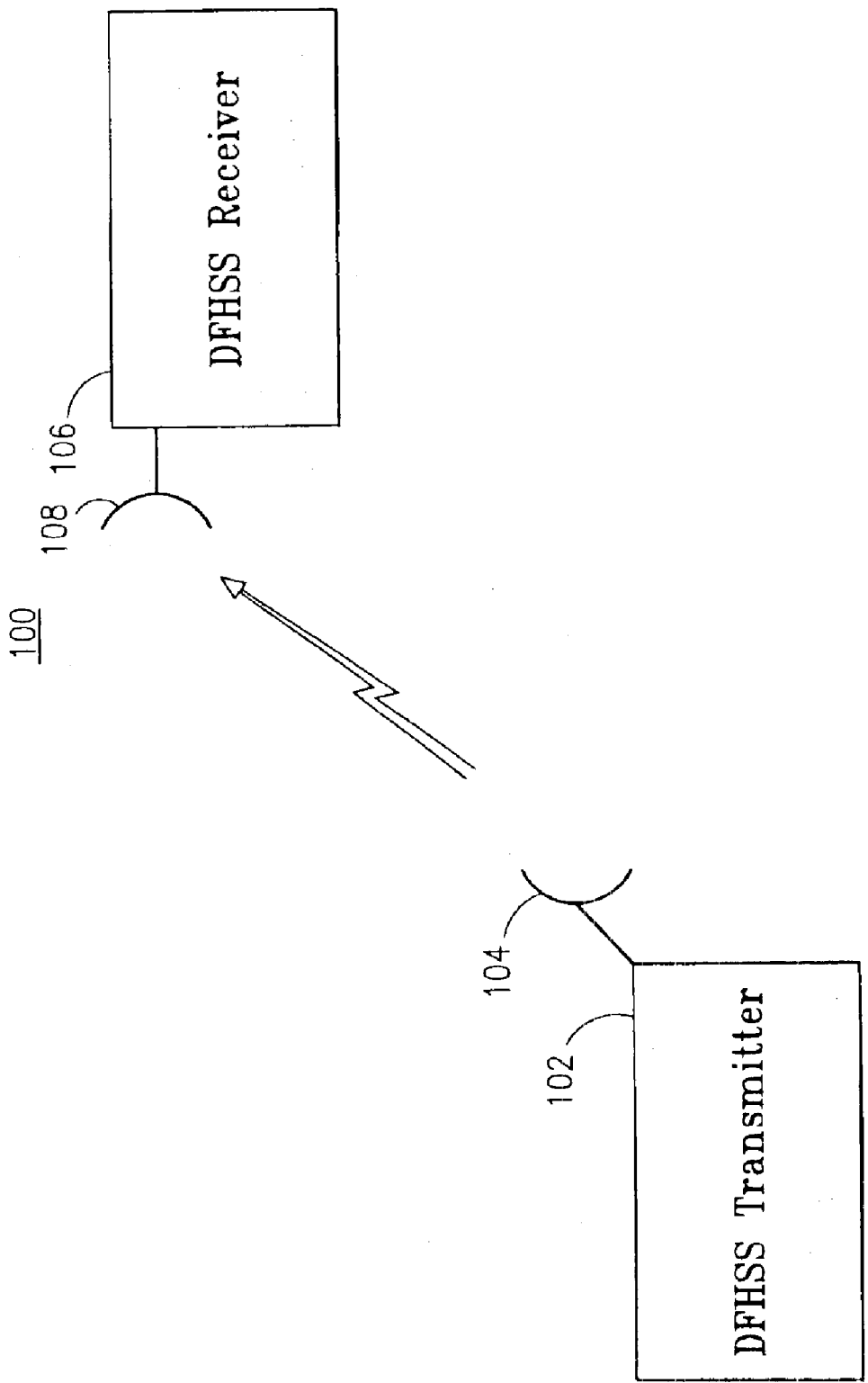
FIG. 1 is a block diagram illustrating a soft-decision trellis-coded, differential frequency-hopped spread spectrum system in accordance with a preferred embodiment of the present invention.

The present invention, according to a preferred embodiment, overcomes problems with the prior art by providing a waveform that is AJ, LPD, allows multiple simultaneous users occupying the same time and frequency bands (conferencing), and is easily implemented by combining frequency hopping (FH) techniques with the concept of trellis encoding. In the DFHSS waveform, the frequency of the transmitted tone depends on both the B current data bits and the previous transmitted tone. In this way, the waveform becomes difficult for unintended users to reconstruct the information content of the transmitted signal. Because the series of transmitted tones form a trellis, the receiver is able to make soft decisions on the data bit estimates, which provides for improved bit error probability performance for the intended user in combination with improved LPD performance for unintended users. For instance, the intended receiver can reconstruct transmissions that are missing due to a fading channel or a collision from another user. The trellis also allows for conferencing of multiple users for receivers that follow multiple trellises. Attempts to jam the waveform by fast-follow-on jammers will actually increase the strength of the received signal and will improve performance of the DFHSS system. This approach is extendible from frequency hopping to any M-ary coding scheme not fully utilizing its capabilities, e.g. hopping in time or code as well as hopping in frequency.

DFHSS is similar to Trellis Coded Modulation (TCM) in that the sequence of transmissions is important, not just the transmitted symbol at each time interval. For both, the sequences are constrained, which provides the ability to correct transmission errors and to improve bit error rate. For DFHSS, the symbol associated with each transition is equivalent to the label for the resulting state. In TCM, the transition labels and state labels are not linked in the same way. In strictly looking at the trellis, then, DFHSS looks like a subset of TCM. However, the resulting states in DFHSS correspond to different frequencies, which spreads the spectrum and improves the LPI/LPD (low probability of interception/low probability of detection) performance of DFHSS relative to TCM. Ultimately, DFHSS combines the increased error correction capabilities of TCM with the advantages of being a spread spectrum waveform. Additionally, the DFHSS waveform allows multiple users and is easily implemented.

It has been shown that DFHSS outperforms standard frequency hopping (FH) and direct sequence spread spectrum (DSSS) under a variety of conditions. The performance advantages include:

1. DFHSS possesses burst error correction capabilities without experiencing-a loss in information rate.
2. DFHSS demonstrates better LPD/LPI performance than fixed FH.
3. DFHSS displays excellent LPD/LPI characteristics without expanding bandwidth.
4. DFHSS has better AJ performance than direct sequence spread spectrum (DSSS) for narrow-band jammers.
5. DFHSS has better LPD/LPI performance than DSSS in fading channels.
6. DFHSS performs better than DSSS in presence of repeat jammers and multipath.
7. The overall LPD/LPI performance of DFHSS is better than that of TCM.
8. DFHSS allows conferenced users as a feature of its waveform, i.e. a media access control layer (MAC) is not required.
9. DFHSS can correct for missed hops and false detections.
10. DFHSS can be self-synchronized.
11. Practical implementation of DFHSS is easier than DSSS.

FIG. 1 illustrates an exemplary DFHSS system according to a preferred embodiment of the present invention. The DFHSS system 100 includes a DFHSS transmitter 102 communicatively coupled to an antenna 104, which broadcasts information to a DFHSS receiver 106 having antenna 108. It should be noted that although a wireless system is depicted in this example, the DFHSS transmitter 102 and DFHSS receiver 106 can also be connected through a wired link (not shown) or any combination of wired and wireless links.

Figure 2:
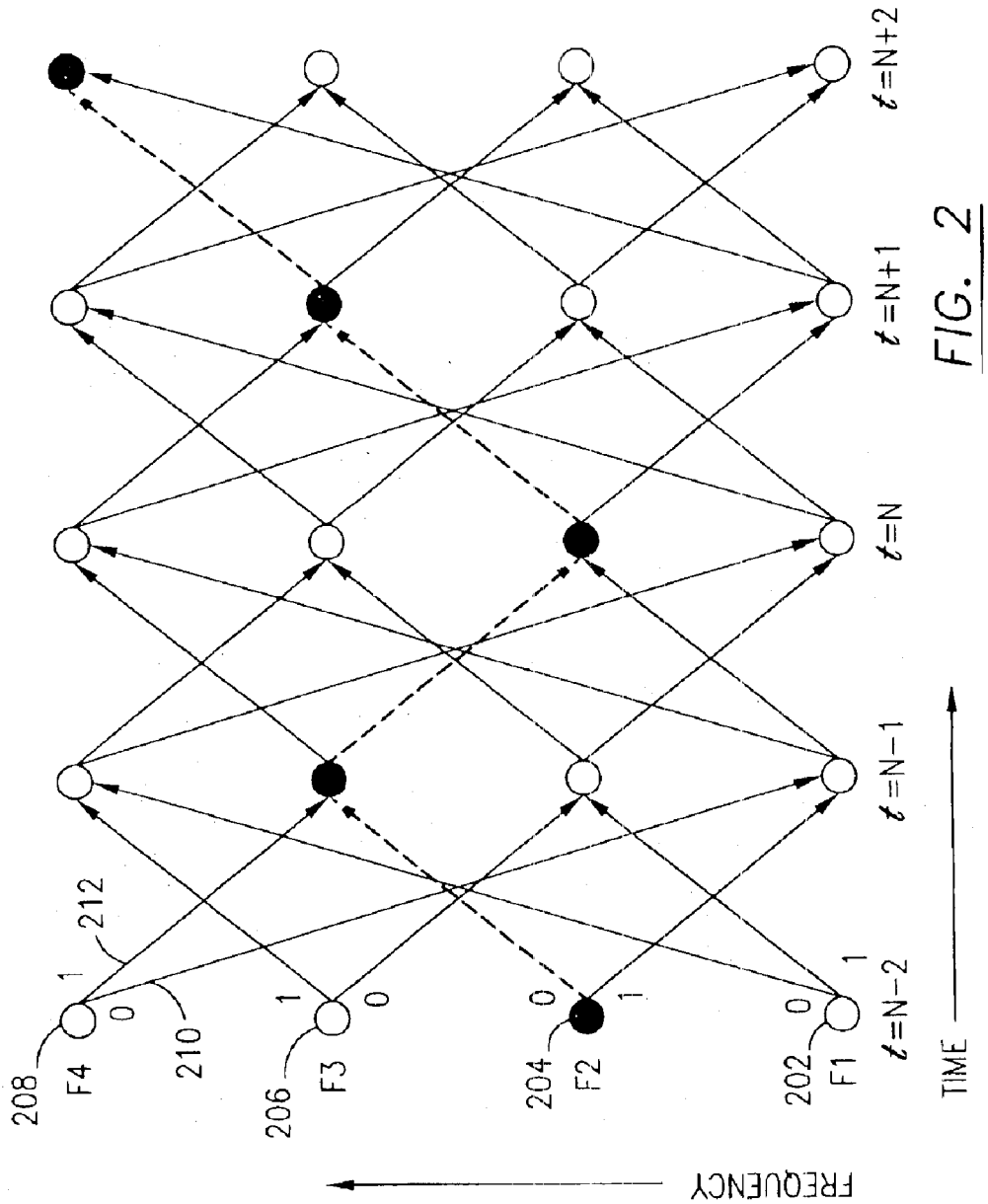
FIG. 2 is a graph illustrating an exemplary trellis model of the system of FIG. 1, according to a preferred embodiment of the present invention.

The DFHSS data are encoded using a technique called differential frequency hopping (DFH). This can be defined in the following manner: Given a data symbol $X_N$, in which a symbol contains B bits, and frequency of the previous hop $F_{N-1}$, the frequency of the next hop is defined as:

$$F_N = G(F_{N-1}, X_N)$$

where the function G can be viewed as a directed graph whose nodes are frequencies and whose vertices are labeled with data patterns. In DFHSS, for a set of M frequencies (the nominal DFHSS hop set), the graph will have M nodes, and each node will have some number of branches $f=2^B$, where B is the number of bits/hop being coded. The parameter f is called the fanout of the graph because it refers to the number of vertices emanating from each node. A simple, example is shown in FIG. 2. The hopset size in this example is 4, therefore there are 4 nodes containing 4 distinct frequencies: F1 202, F2 204, F3 206, and F4 208. This example is encoding 1 bit/hop, so each node has 2 vertices for an input of "0" 210 or "1" 212. For a DFHSS system using a hopset size of 16 frequencies to encode 2 bits/hop, each of the 16 nodes in the trellis would have four vertices, one associated with each of the four possible inputs. A block of data is encoded by breaking it into symbols of B bits, and traversing the graph starting at some random node. This is done by executing a hop at each node to the next frequency specified by that node for the current data bit(s).

Figure 3:
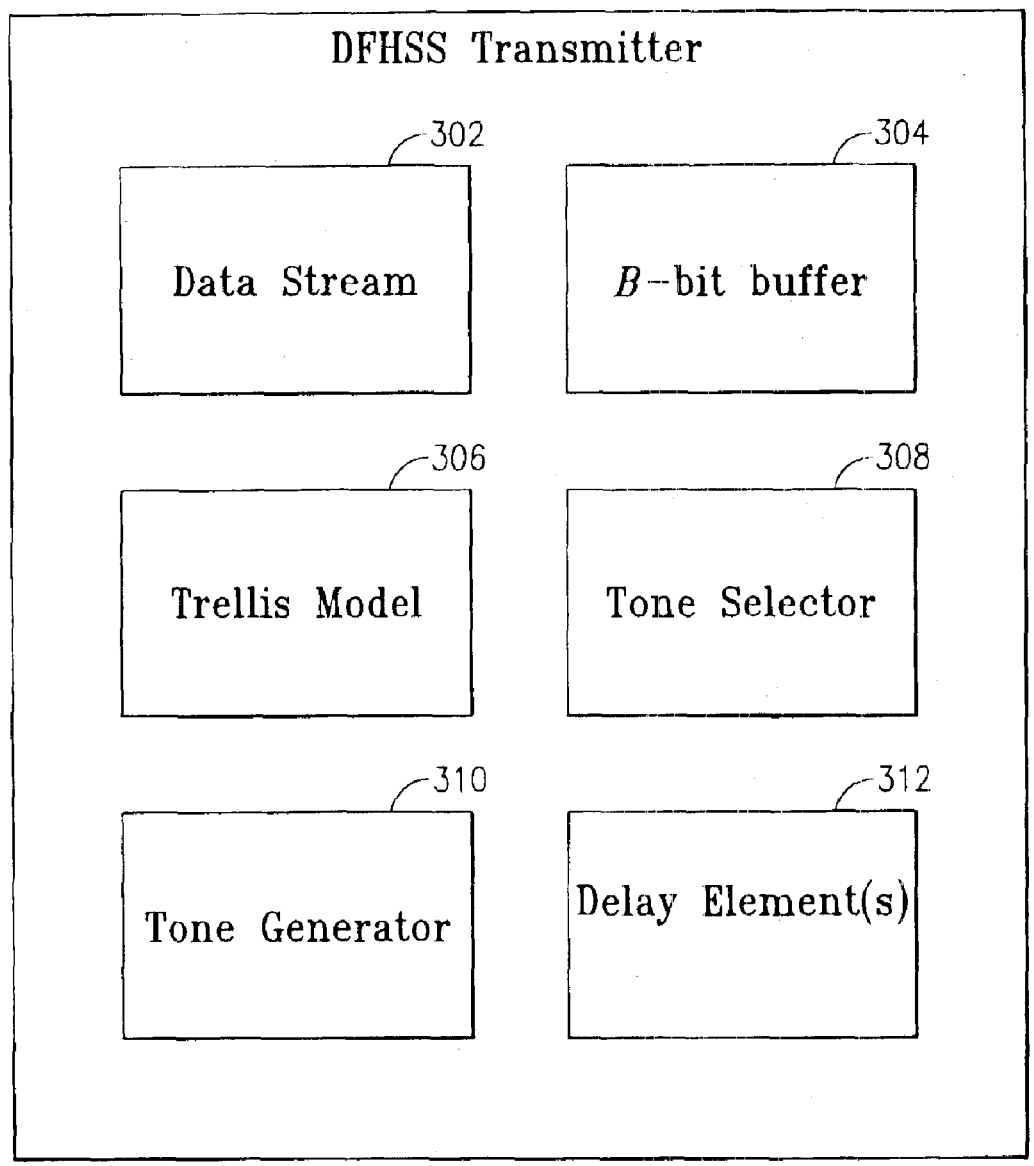
FIG. 3 is a more detailed block diagram showing an exemplary transmitter in the system of FIG. 1, according to a preferred embodiment of the present invention.

A block diagram of an exemplary DFHSS transmitter is shown in FIG. 3. A data stream 302, containing information to be transmitted, is communicatively coupled with a B-bit buffer 304 where the value of B is the number of bits that will be transmitted per frequency hop. A tone selector 308 is communicatively coupled with the B-bit buffer 304, a set of delay elements 312 containing information relating to the previously transmitted frequencies, a trellis model 306, and a tone generator 308.

Figure 4:
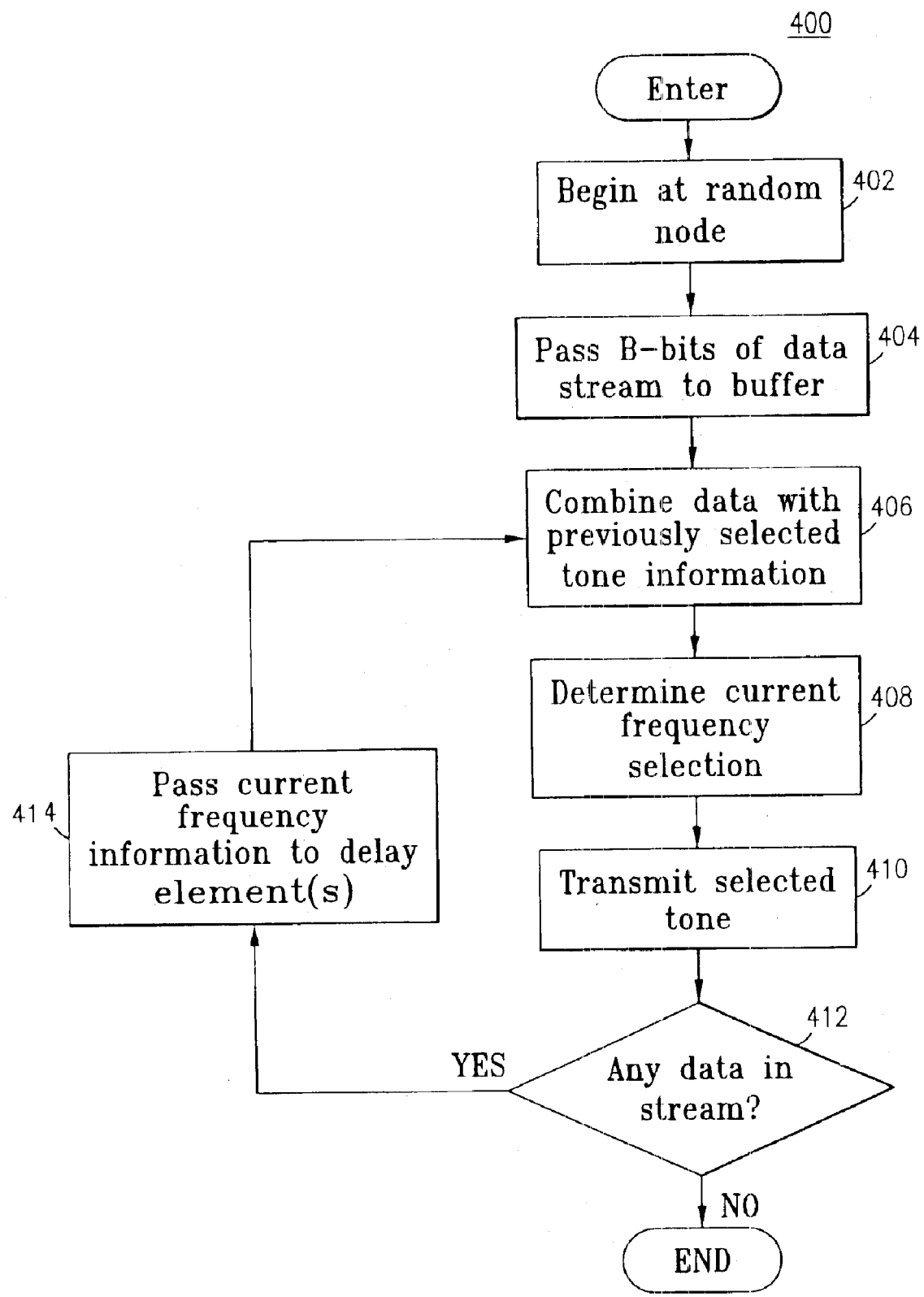
FIG. 4 is an operational flow diagram describing an exemplary operational sequence of the transmitter of FIG. 3, according to a preferred embodiment of the present invention.

An exemplary operational sequence of the transmitter is illustrated in FIG. 4, where, at step 402, the transmitter 102 begins at some random node of the trellis model 306. The data bit stream 302 is passed at step 404 to a B-bit buffer 304 that collects B-bits of the data stream 302. The B-bit symbol is passed, at step 406, to the tone selector 308, where the current data information is combined with the tone selector information from the previously transmitted tone to determine the current frequency selection. The current frequency selection is made at step 408. The current frequency selector information is then sent to the tone generator 310, which transmits the selected tone at step 410. In addition, if any data is left in the stream at step 412, the current frequency selection is passed to the delay element 312 so that the information can be used as the previous selection information at step 406 in the next time interval. Trellis models, often used in depicting and analyzing convolutional codes, are easily applied to frequency-hopped signals as a tone-selector 308 to form differential frequency hopped signal. For instance, if the vertical axis of the trellis corresponds to frequency and the horizontal axis corresponds to time, then the set of states in a stage, i.e. at any given time, corresponds to the set of all possible frequencies that may be transmitted by the system. For a hop set of size M, there are M states at each stage in the trellis. The branches leaving each state terminate at the allowable transmitted frequencies at the next hop given the current frequency state. The number of branches, f, leaving each state is dependent on the number of encoded bits per hop B, i.e. $f=2^B$. A label on each branch indicates the encoded bit that initiates the transition from the current transmitted frequency to the next transmitted frequency.

Figure 5:
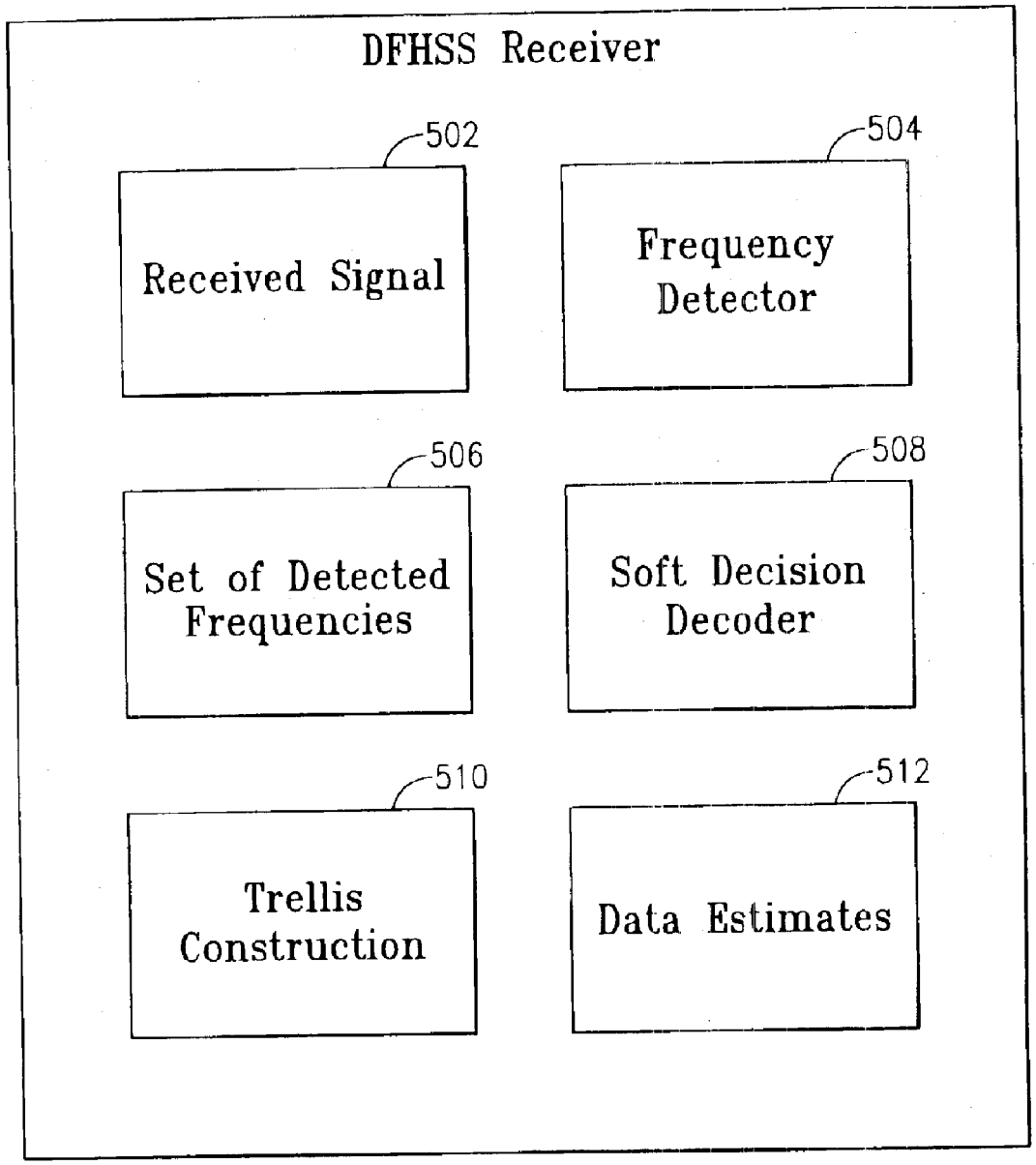
FIG. 5 is a more detailed block diagram showing an exemplary receiver in the system of FIG. 1, according to a preferred embodiment of the present invention.
Figure 6:
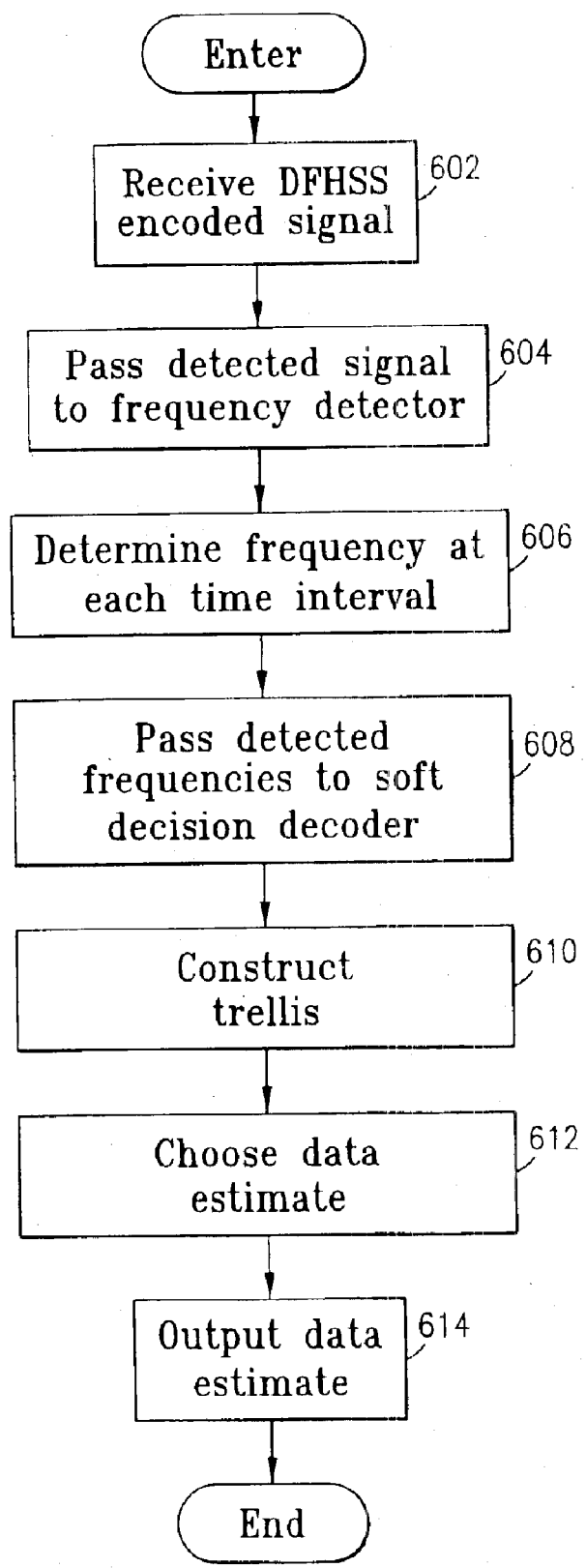
FIG. 6 is an operational flow diagram describing an exemplary operational sequence of the receiver of FIG. 5, according to a preferred embodiment of the present invention.

FIG. 5 shows a block diagram of an exemplary DFHSS receiver 106 intended to decode a single transmitter in a preferred embodiment of the present invention. A received signal 502 is communicatively coupled to a frequency detector 504, which passes a set of detected frequencies 506 to a soft decision decoder 508. The soft decision decoder 508 constructs a trellis 510 and outputs data estimates 512. The operation conducted in a DFHSS receiver for a system following one trellis is illustrated in FIG. 6. A DFHSS encoded signal 502 is received at step 602. The detected signal 502 is passed to a frequency detector 504 at step 604. The frequency detector 504, at step 606, determines which frequency(ies) are detected at each time interval. The set of detected frequencies 506 are passed to the soft decision decoder 508, at step 608, which determines a soft-decision estimate of the transmitted data bits. The technique used by the soft decision decoder 508 may be any soft-decision trellis decoding technique, such as the soft-Viterbi (SV) or maximum a posteriori (MAP) decoders. For instance, a soft-Viterbi decoder may be used which places the detected frequencies at each symbol interval on a trellis construction 510, and then the decoder 508 attempts to "connect" the detected frequencies according to known trellis constraints of the transmitted signal. Burst errors are correctable because missing nodes on the trellis may be inferred from the existing nodes on the trellis (on both sides of the missing node(s)), due to the trellis-encoded nature of the transmitted signal. Soft-decision decoding provides an estimate of the demodulated symbol as well as a confidence value for that estimate, and after some delay, the decoder chooses the actual estimate, at step 612. The data estimates provided by the soft-decoding technique are output at step 614. This process improves performance when compared to other modulation types and to hard-decision techniques.

Figure 7:
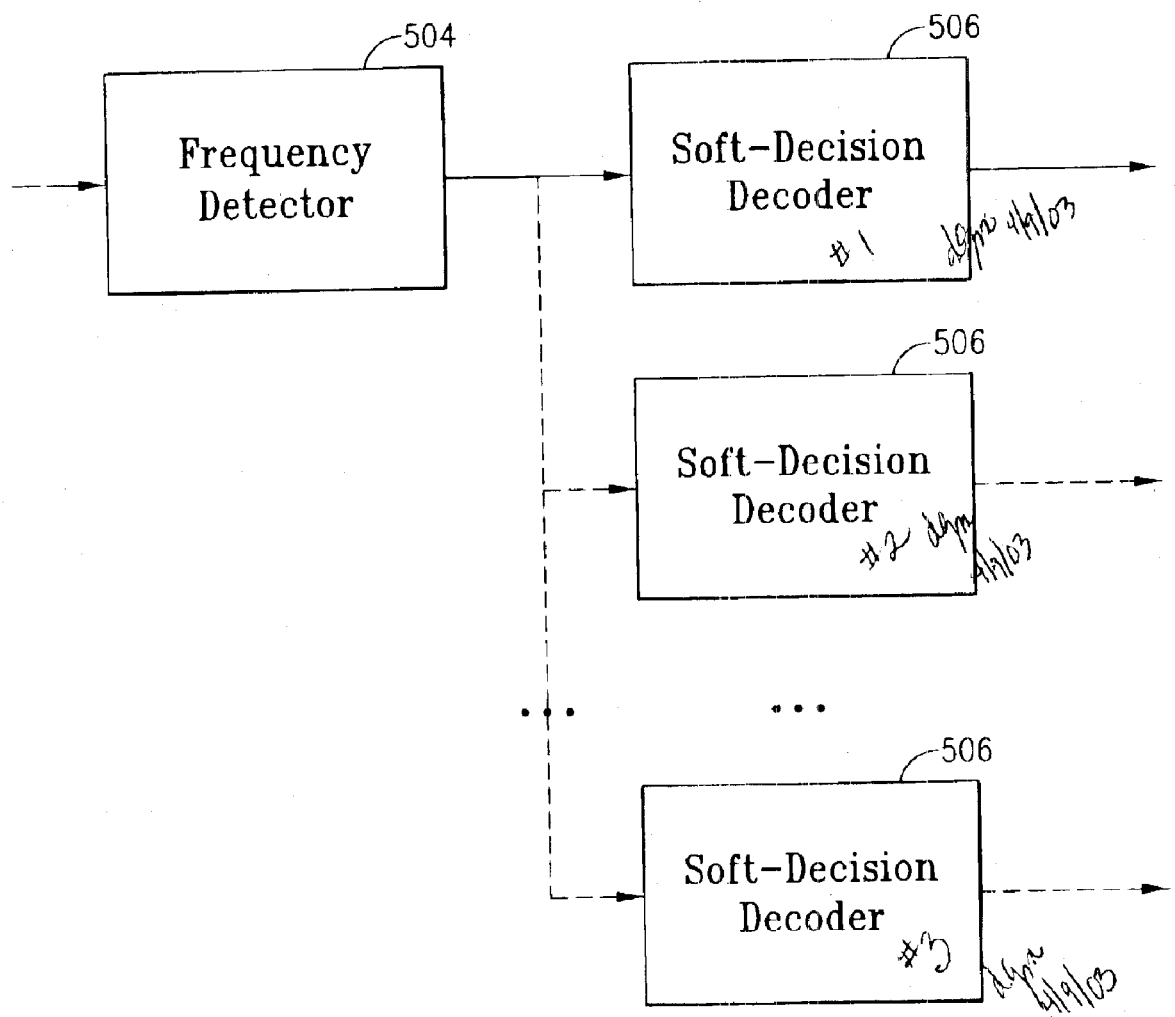
FIG. 7 is an operational flow diagram describing an exemplary operational sequence of an implementation in which multiple signals are demodulated, according to a preferred embodiment of the present invention.
Figure 8:
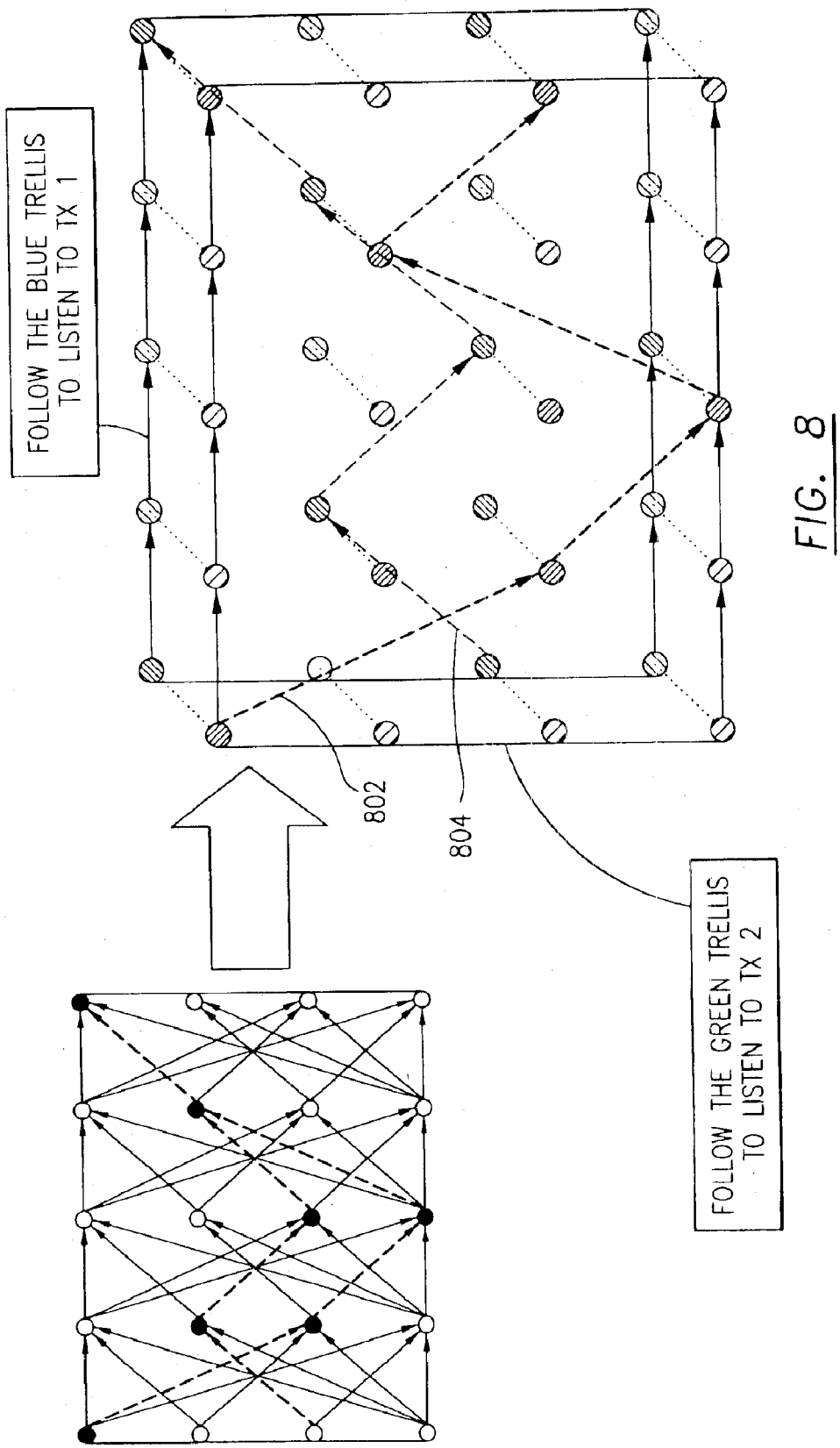
FIG. 8 is a graph illustrating an exemplary trellis model in which multiple signals are demodulated, according to a preferred embodiment of the present invention.

For a system in which the receiver 106 is interested in demodulating signals from several users, the soft decision decoding is replicated for each desired signal, as shown in FIG. 7. Each box 506 in FIG. 7 represents the soft-decision trellis decoding process that is followed for each desired user. Each box 506 is functionally identical, but decodes the received signal by using the trellis of the transmitting user of interest. FIG. 8 is a graph illustrating an exemplary trellis model in which multiple signals are demodulated. The receiver 106 follows path 802 to listen to a first transmitter, and follows path 804 to listen to a second transmitter.

PROPERTIES

DFHSS is more energy efficient than fixed FH for same spreading factor, which implies that DFHSS demonstrates better LPD/LPI than fixed FH.

Lower energy is required by DFHSS than by a fixed BFSK system with the same error performance when 1 data bit is transmitted per hop. That is, DFHSS is more energy efficient than fixed FH for the same spreading factor, which implies that DFHSS demonstrates better LPD/LPI than fixed FH. For example, BFSK requires approximately 6 dB more signal-to-noise power ratio (SNPR) than the DFHSS union bound with M=64 to achieve bit error probabilities between $10^{-3}$ and $10^{-6}$. This difference increases with increasing M to approximately an 8 dB difference between BFSK and DFHSS with M=16,384.

DFHSS and DSSS over the same bandwidth (BW) have the same LPD/LPI characteristics when the threat is a radiometer.

This property is apparent when the LPI margin metric is considered. For instance, BPSK DSSS requires between 1.5 and 2.5 dB more SNPR than the DFHSS union bound with M=64 to achieve bit error probabilities between $10^{-3}$ and $10^{-6}$. This difference increases with increasing M to the 3.5 to 4.5 dB range between BPSK DSSS and DFHSS with M=16,384. The BPSK DSSS performance is marginally better when the bit error probability is on the order of $10^{-1}$, but this is an unacceptable operating regime. Therefore, DFHSS is slightly more energy efficient than BPSK DSSS (between 1.5 and 4.5 dB) over the same BW so that it has similar or better LPD/LPI characteristics when the threat is a radiometer.

DFHSS and DSSS have similar AJ performance for wide-band (WB) jammers

Assuming a wide-band jamming model consisting of a spectrally-flat barrage jammer across the entire communications bandwidth, BPSK DSSS requires only approximately 0.4 dB more SNPR than the DFHSS union bound with M=64 to achieve a bit error probability of $10^{-1}$ and approximately 1.3 dB more SNRP to achieve $P_e=10^{-6}$. This difference increases with increasing M to approximately 2.4 and 3.3 dB for DFHSS with M=16,384. The BPSK DSSS performance is marginally better when the bit error probability is on the order of $10^{-1}$ but this is usually an unacceptable operating regime. Therefore, a little less energy is required by DFHSS than by BPSK DSSS with the same error performance in the presence of WB jamming. This demonstrates that DFHSS and DSSS have similar anti jam performance for WB jammers.

DFHSS has better LPD/LPI characteristics than DSSS over the same BW in a Rayleigh-fading channel The Rayleigh fading channel is a more appropriate model for signals that propagate with multipath and fading. When the Rayleigh fading channel model is used, BPSK DSSS requires approximately 13 dB more SNPR than the DFHSS union bound with M=16 to achieve a bit error probability of $10^{-3}$ and approximately 21 dB more SNPR to achieve $P_e=10^{-4}$. This difference increases with increasing M to approximately 17 and 24 dB for DFHSS with M=64, and to approximately 19 and 27 dB for M=16,384.

Therefore, lower energy is required by DFHSS than by a BPSK DSSS system with the same error performance. Assuming that the detector performance is identical for both waveforms implies that DFHSS demonstrates significantly better potential for LPD/LPI than BPSK DSSS in a Rayleigh fading channel.

DFHSS performs better than DSSS in presence of repeat jammers

If a narrow-band repeat jammer follows quickly enough to transmit at the DFHSS frequency during the hop dwell time, the received energy at the receiver will actually increase, which increases the detection capabilities of the intended receiver instead of blocking the reception of the tone. Even if the jammer is slow enough that it tries to jam the transmission frequency for a previous interval, a RAKE filter can be used at the DFHSS receiver to harvest the energy of the jamming signal and increase the detection capabilities. That is, the jamming signal will appear as a strong multipath signal that has been recovered by the RAKE receiver. If a RAKE filter is not used for the delayed jamming case, the jamming signal can either be considered a false "hit" by the receiver or can be considered a repetition of the message. The worst DFHSS performance in the presence of a repeat jammer is equal to the DFHSS performance when no jammer is present.

For a BPSK DSSS system, the jamming signal will be included in the received signal after it is de-spread by the receiver, thus corrupting information. For example, at an operating point of $P_e=10^{-4}$, BPSK DSSS in the presence of a repeat jammer can require as little as 0.5 dB more SNR or as much as 30 dB more SNR over the same signal in the absence of a repeat jammer.

Even though DFHSS is less energy efficient than trellis coded modulation (TCM), it occupies significantly greater bandwidth, so the overall LPD/LPI performance of DFHSS is better.

A sub-optimal implementation of DFHSS will have an energy efficiency similar to that of TCM. However it is immediately obvious that the bandwidth of DFHSS is wider than the bandwidth of TCM, leading to the conclusion that the overall LPD/LPI performance of DFHSS is better than TCM.

DFHSS allows conferenced users

DFHSS can allow multiple simultaneous users occupying the same time interval and frequency bands (conferenced users) without the additional imposition of time-division multiple access (TDMA) or power control. The conferencing allowed is multipoint-to-multipoint, with the only requirements being that the receiver used by each conferenced user know the underlying trellis for the transmitting users of interest to that particular receiver. Recognize that each conferenced user possess the processing capability to follow multiple (different) trellises. In addition to the conferencing capability, DFHSS will allow multiple users to transmit in the same time and frequency bands with knowledge of only the trellises of interest, with little effect on bit error performance.

DFHSS has better AJ performance than DSSS for NB jammers

DFHSS provides excellent resistance to narrow-band (NB) jamming because DFHSS offers a burst error correction capability with no loss in the information rate. Based on this feature, a narrow-band (NB) jammer has little to no effect on DFHSS waveform performance. On the other hand, assuming a 10 dB jammer, BPSK DSSS requires approximately 11 dB more SNPR to achieve the equivalent performance of DFHSS.

DFHSS can be self-synchronizing (vs. pilot tone synch for DSSS, and sync for fixed FH)

Self-synchronization is a result of the trellis structure of DFHSS and its ability to correct missed hops. A self-synchronizing system is less likely to be detected by an interceptor because the cyclic synch sequence is not required. By contrast, DSSS requires a pilot tone and fixed FH requires periodic synch sequences. The DFHSS system uses the actual transmitted data (not a synch sequence) and the trellis nature of the waveform to converge to the correct path on the trellis. Based on the convergence of convolutional codes using Viterbi decoding, the DFHSS system could require up to 10*log 2(M) transmission intervals before converging to the correct path. However, if the information is stored, once the decoder has converged, it can go back to the ambiguous portion of the trellis and use the missed-hop correction capabilities to "fill-in" portions of the sequence.

Practical implementation of DFHSS is easier than DSSS

Several characteristics of the DFHSS waveform indicate that practical implementation of DFHSS should be less costly than that of DSSS. For instance, DFHSS has a (much) smaller instantaneous bandwidth (IBW) when compared to DSSS with same spreading factor. The smaller instantaneous bandwidth allows the designer to specify a retuneable, narrower BW antenna for DFHSS (and other single-tone FH waveforms); DSSS would require an antenna with a "wide-enough" BW. Typical instantaneous, bandwidth for a tactical antenna is 5-10% of frequency band center, e.g. at 4 MHz, IBW–40 kHz, which are numbers that work easily with DFHSS and standard FH waveforms.

A narrower instantaneous bandwidth is also desirable when considering A/D converters (ADCs). For DFHSS and standard FH waveforms, several ADCs for the narrower bands are less expensive than a single ADC with wide phase coherence, as required by DSSS. For instance, one embodiment of the DFHSS algorithm consists mainly of FFTs and soft Viterbi decoding, lending itself to straightforward FPGA implementation. Additionally, multiple trellises for conferenced systems could be modularly implemented. The computational complexity of the algorithm as implemented increases exponentially as M and B increase due to the soft Viterbi decoding. The complexity results not from the different types of operations (primarily add and compares) but from the large number of them. Alternative and sub-optimal embodiments could also be implemented in an FPGA. In addition to featuring a narrow IBW, DFHSS does not require a modulated signal, which keeps the complexity and cost of circuit boards relatively low.

ALTERNATIVE EMBODIMENTS

Although the preferred embodiment specifically details transmitting data and determining a frequency value based on the current data and previous frequency values, the concept can be extended to apply to other properties of the signal, including but not limited to, phase, coding, dwell, and duty cycle. Likewise, although the preferred embodiment models the rule for decoding the transmitted data as a trellis, the system may use any predetermined rule to accomplish this function.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A system comprising:

at least one transmitter for encoding and transmitting soft-decision trellis-coded differential frequency-hopped spread spectrum (DFHSS) waveforms, wherein the at least one transmitter includes:
      a B-bit buffer, comprising bits from a data stream, wherein the value of B (a natural number) is the number of bits that will be transmitted per frequency hop;
      a trellis model, comprising
         a set of at least two axes, wherein at least one axis corresponds to time and at least one axis corresponds to frequency; a set of M (a natural number) states, corresponding to a set of all possible frequencies that may be transmitted by the system; and branches leaving each state, wherein the branches terminate at allowable transmit frequencies for at least one next frequency hop given a current frequency state;
         a tone selector, communicatively coupled with the B-bit buffer and trellis model, for selecting a current frequency, given at least one previous frequency and data from the B-bit buffer; a tone generator, communicatively coupled with the tone selector, for transmitting the selected frequency; and
         a delay element, communicatively coupled with the tone selector and the tone generator, comprising information relating to the current frequency, for feeding back current frequency information to be used as previous frequency information when selecting the at least one next frequency;
      at least one communication link, communicatively coupled to the at least one transmitter, for transferring soft-decision trellis-coded DFHSS waveforms; and
      at least one receiver, communicatively coupled to the at least one communication link, for receiving and decoding the soft-decision trellis-coded DFHSS waveforms.

2. The system of claim 1, wherein the at least one communication link comprises at least one of a wired link and a wireless link.

3. The system of claim 1, wherein the number of branches leaving each state of the trellis model is dependent on the number of encoded bits per hop.

4. The system of claim 1, wherein the at least one receiver comprises:
   a frequency detector, for providing a set of at least one detected frequency during a predetermined time interval from a received soft-decision trellis-coded DFHSS signal; and
   at least one soft decision decoder, communicatively coupled to the frequency detector, for determining an estimate of a transmitted data bit.

5. The system of claim 4, wherein the at least one soft decision decoder comprises:
   a trellis model, comprising
      a set of at least two axes, wherein at least one axis corresponds to time and at least one axis corresponds to frequency;
      a set of M states, corresponding to a set of all possible frequencies that may be received by the system; and
      branches leaving each state, wherein the branches terminate at allowable receive frequencies for a next frequency hop given a current frequency state.

6. The system of claim 5, wherein the number of branches leaving each state of the trellis model is dependent on the number of encoded bits per hop.

7. The system of claim 4, wherein the at least one soft decision decoder is a soft-Viterbi decoder.

8. The system of claim 4, wherein the at least one soft decision decoder is a maximum a posteriori (MAP) decoder.

9. An apparatus comprising:
   a B-bit buffer, comprising bits from a data stream, wherein the value of B (a natural number) is the number of bits that will be transmitted per frequency hop;
   a trellis model, comprising
      a set of at least two axes, wherein at least one axis corresponds to time and at least one axis corresponds to frequency;
      a set of M (natural number) states, corresponding to a set of all possible frequencies that may be transmitted by the system; and
      branches leaving each state, wherein the branches terminate at allowable transmit frequencies for a next frequency hop given a current frequency state;
   a tone selector, communicatively coupled with the B-bit buffer and trellis model, for selecting a current frequency, given a previous frequency and data from the B-bit buffer;
   a tone generator, communicatively coupled with the tone selector, for transmitting the selected frequency; and
   a delay element, communicatively coupled with the tone selector and the tone generator, comprising information relating to the current frequency, for feeding back current frequency information to be used as previous frequency information when selecting the next frequency.

10. The apparatus of claim 9, wherein the number of branches leaving each state of the trellis model is dependent on the number of encoded bits per hop.

11. An apparatus comprising:
   a frequency detector, for providing a set of at least one detected frequency during a predetermined time interval from a received soft-decision trellis-coded DFHSS signal; and
   at least one soft decision decoder, communicatively coupled to the frequency detector, for determining an estimate of a transmitted data bit, wherein the at least one soft decision decoder includes a trellis model, comprising:
      a set of at least two axes, wherein at least one axis corresponds to time and at least one axis corresponds to frequency;
      a set of M (a natural number) states, corresponding to a set of all possible frequencies that may be received by the system; and
      branches leaving each state, wherein the branches terminate at allowable receive frequencies for a next frequency hop given a current frequency state.

12. The apparatus of claim 11, wherein the number of branches leaving each state of the trellis model is dependent on the number of encoded bits per hop.

13. The apparatus of claim 11, wherein the at least one soft decision decoder is a soft-Viterbi decoder.

14. The apparatus of claim 11, wherein the at least one soft decision decoder is a maximum a posteriori (MAP) decoder.

15. A method comprising:
   beginning at a random node of a trellis model;
   passing B (a natural number) bits of data to a buffer;
   combining the B bits of data with information for an at least one previously selected frequency to select a current tone;
   transmitting the currently selected frequency; and
   feeding back information relating to the currently selected frequency to be used as previously selected frequency information when selecting a next frequency.

16. The method of claim 15, wherein the trellis model comprises:
   a set of at least two axes, wherein at least one axis corresponds to time and at least one axis corresponds to frequency;
   a set of M (a natural number) states, corresponding to a set of all possible frequencies that may be transmitted by the system; and
   branches leaving each state, wherein the branches terminate at allowable transmit frequencies for a next frequency hop given a current frequency state.

17. The method of claim 16, wherein the number of branches leaving each state of the trellis model is dependent on the number of encoded bits per hop.

18. A method comprising:
   receiving a soft-decision trellis-coded differential frequency-hopped spread spectrum (DFHSS) signal;
   passing the received signal to a frequency detector;
   detecting at least one frequency per a predetermined time interval;
   passing the at least one detected frequency to a soft decision decoder;
   constructing a trellis model using the detected frequencies as nodes;
   estimating a data value according to known trellis constraints of a transmitted signal; and outputting a data estimate.

19. The method of claim 18, wherein the trellis model comprises:
   a set of at least two axes, wherein at least one axis corresponds to time and at least one axis corresponds to frequency;
   a set of M(a natural number) states, corresponding to a set of all possible frequencies that may be received by the system; and
   branches leaving each state, wherein the branches terminate at allowable receive frequencies for a next frequency hop given a current frequency state.

20. The method of claim 19, wherein the number of branches leaving each state of the trellis model is dependent on the number of encoded bits per hop.

21. The method of claim 18, wherein the at least one soft decision decoder is a soft-Viterbi decoder.

22. The method of claim 18, wherein the at least one soft decision decoder is a maximum a posteriori (MAP) decoder.

23. A computer readable medium, comprising computer instructions for performing the steps of:
   beginning at a random node of a trellis model;
   passing B (a natural number) bits of data to a buffer;
   combining the B (a natural number) bits of data with information for an at least one previously selected frequency to select a current tone;
   transmitting the currently selected frequency; and
   feeding back information relating to the currently selected frequency to be used as previously selected frequency information when selecting a next frequency.

24. The computer readable medium of claim 23, wherein the trellis model comprises:
   a set of at least two axes, wherein at least one axis corresponds to time and at least one axis corresponds to frequency;
   a set of M (a natural number) states, corresponding to a set of all possible frequencies that may be transmitted by the system; and
   branches leaving each state, wherein the branches terminate at allowable transmit frequencies for a next frequency hop given a current frequency state.

25. The computer readable medium of claim 24, wherein the number of branches leaving each state of the trellis model is dependent on the number of encoded bits per hop.

26. A computer readable medium, comprising computer instructions for performing the steps of:
   receiving a soft-decision trellis-coded differential frequency-hopped spread spectrum (DFHSS) signal;
   passing the received signal to a frequency detector;
   detecting at least one frequency per a predetermined time interval;
   passing the at least one detected frequency to a soft decision decoder;
   constructing a trellis model using the detected frequencies as nodes;
   estimating a data value according to known trellis constraints of a transmitted signal; and outputting a data estimate.

27. The computer readable medium of claim 26, wherein the trellis model comprises:
   a set of at least two axes, wherein at least one axis corresponds to time and at least one axis corresponds to frequency;
   a set of M (a natural number) states, corresponding to a set of all possible frequencies that may be received by the system; and
   branches leaving each state, wherein the branches terminate at allowable receive frequencies for a next frequency hop given a current frequency state.

28. The method of claim 27, wherein the number of branches leaving each state of the trellis model is dependent on the number of encoded bits per hop.

29. The method of claim 26, wherein the at least one soft decision decoder is a soft-Viterbi decoder.

30. The method of claim 26, wherein the at least one soft decision decoder is a maximum a posteriori (MAP) decoder.

* * * * *